L. Gould,
Tenoning Machine.
No. 112,444. Patented Mar. 7, 1871.
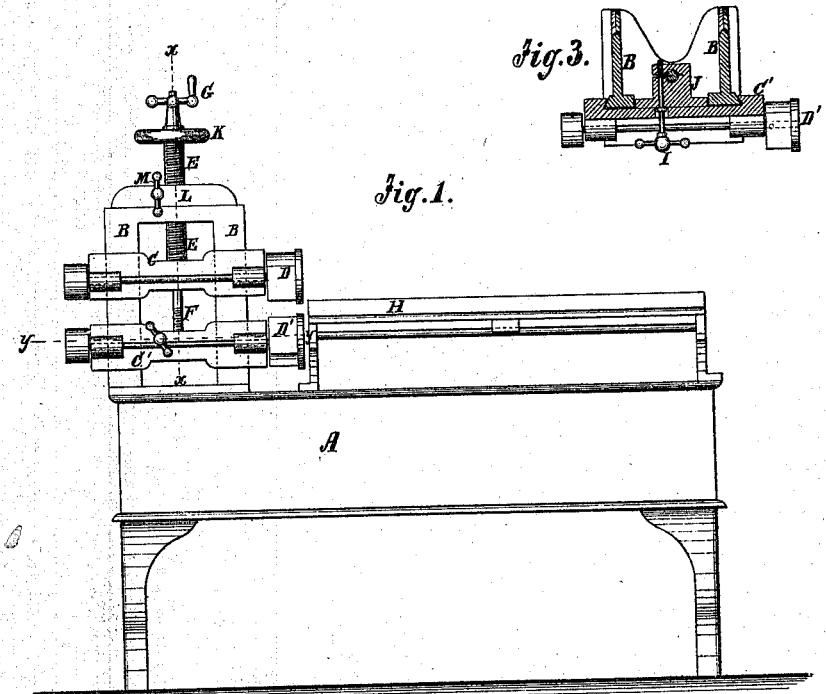
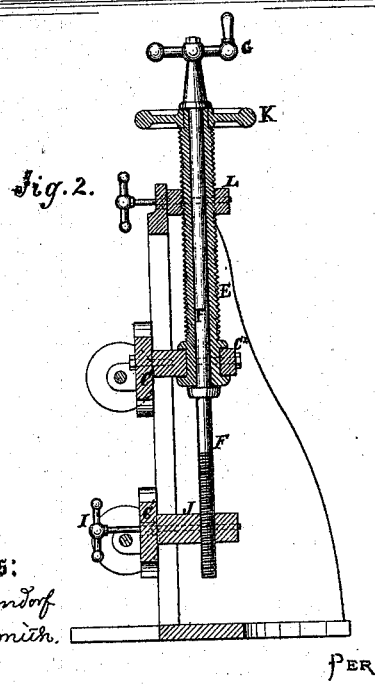
Witnesses:
A. Benneckendorf
Wm. H. C. Smith.
Inventor:
L. Gould.
Attorneys.

UNITED STATES PATENT OFFICE.

LYMAN GOULD, OF NORWICH, CONNECTICUT.

IMPROVEMENT IN TENONING-MACHINES.

Specification forming part of Letters Patent No. 112,444, dated March 7, 1871.

*To all whom it may concern:*

Be it known that I, LYMAN GOULD, of Norwich, in the county of New London and State of Connecticut, have invented a new and Improved Tenoning-Machine; and I do hereby declare that the following is a full, clear, and exact description thereof, which will enable others skilled in the art to make and use the same, reference being had to the accompanying drawing, forming part of this specification.

Figure 1 is a front view; Fig. 2, a section on the line $x\,x$; and Fig. 3 is a section on the line $y\,y$.

A is the frame, upon which the operating parts are supported; B, the standards or frame, on which the yokes C $C^1$, for the support of cutter-heads D D', are mounted to work vertically. E is a tubular screw, screwing through clamp-nut L and connected to yoke C, and through which the screw F, which screws in a clamp-nut, J, on yoke $C^1$, passes, and is operated by the crank G to raise the cutter-head D' above or below the carriage H, on which the stuff is placed to be worked as may be required.

The clamp-nut J has a check thumb-screw, I, which allows the screw F to work freely in the nut J, to adjust the cutter-head in position or clamp the nut tightly to the screw when adjusted.

The placing of the upper head, D, in position is done by the tubular screw E, working in a clamp-nut, L, at the top, the lower end working in a bearing on yoke C, and kept in position therein by means of two collars on said screw E, which is operated by the hand-wheel K. This screw E at the same time carries the screw F by its friction, and it being the same pitch in the thread as the screw E will work in clamp-nut J, and allow the cutter-head D' to remain stationary while D is moved.

To adjust both cutter-heads up or down at the same time after the distance between them has been obtained, I make the screw F fast by checking it in the nut J by the thumb-screw I, so that it will not turn by the friction with said screw E, and then turn the hand-wheel K, by which both heads will move alike at the same time up or down, as may be required.

When the heads are in position for work, I check the screw E by means of clamp-nut L and thumb-screw $m$, and the whole is made fast.

What I claim as my invention, and desire to secure by Letters Patent, is—

The combination of devices for adjusting tenoning-machine cutter-heads, consisting of a screw, F, with a hand-crank, working within a tubular adjusting-screw, E, and clamp-nut J, the latter on the lower cutter-head stock, and screw E, working in the clamp-nut L on the frame, and the bearing $C^2$ on the upper cutter-head support, all for the purpose of operating either head independent of the other, or both together, substantially in the manner described.

LYMAN GOULD.

Witnesses:
T. B. MOSHER,
GEO. W. MABEE.